BEST AVAILABLE COPY

W. TWITCHELL.

Hot-Air Furnaces.

No. 5,871. Reissued May 12, 1874

Fig. 1.

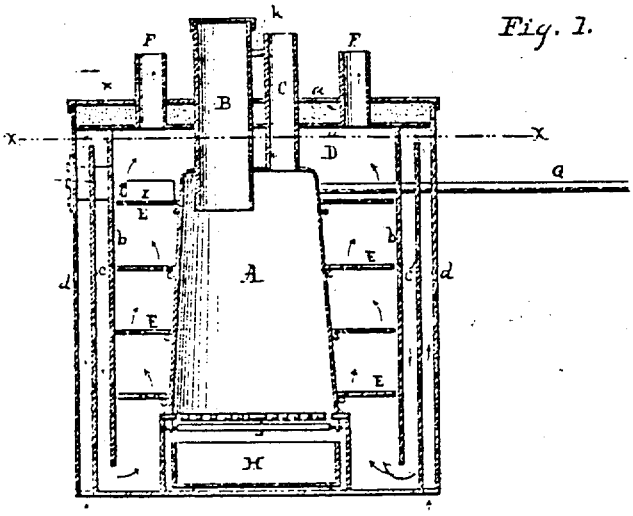

Fig. 2.

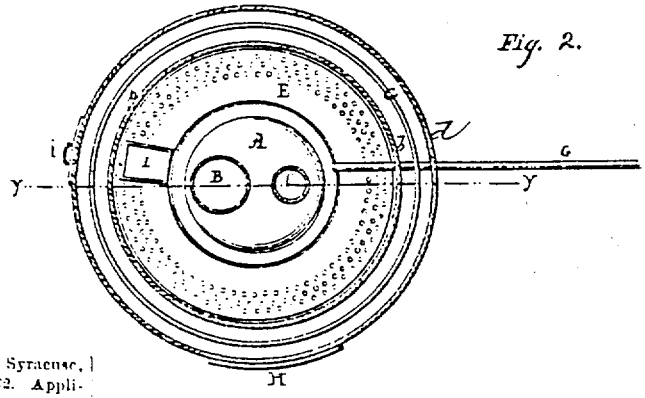

Inventor.
W. Twitchell

5,871.—Hot-Air Furnace.—WILLARD TWITCHELL, Syracuse, N. Y.—Patent No. 131,523, dated September 24, 1872. Application filed March 4, 1874.

The construction of the fire-chamber, the magazine, and the smoke-flue in a single casting is designed to render the escape of gas into the heating-chamber impossible.

*Claim.*—1. The combination and arrangement of the sheet-metal concentric walls *b c d* with and surrounding the chamber of combustion, forming three concentric air-chambers, as and for the purposes specified, by which the air is made to enter at the bottom, and ascend through the space between the outer case *d* and second case *c*, whence it is deflected downward, over the top of *c*, to the bottom of *b*, and thence upward to the exit pipes at the top, inside of *b*, all as herein specifically described.

2. In combination with the chamber D, the fire-pot A, magazine A and pipe C, cast in one piece, and without a joint, within said chamber D, substantially as and for the purposes described.

3. In combination with the furnace A B C D, the oxygen pipe G, extended into the open air, as and for the purposes specified.

AM PHOTO-LITHOGRAPHIC CO N Y OSBORNE'S PROCESS